United States Patent Office 3,148,983
Patented Sept. 15, 1964

3,148,983

LIGHT SENSITIVE O-QUINONE DIAZIDES AND THE PHOTOMECHANICAL PREPARATION OF PRINTING PLATES THEREWITH

Fritz Endermann, Wiesbaden, and Wilhelm Neugebauer and Maximilian Karl Reichel, both of Wiesbaden-Biebrich, Germany, assignors, by mesne assignments, to Azoplate Corporation, Murray Hill, N.J.

No Drawing. Filed Aug. 12, 1960, Ser. No. 49,177
Claims priority, application Germany Aug. 29, 1959
34 Claims. (Cl. 96—33)

The production of printing plates, in particular planographic printing plates, by a process involving the formation of coatings consisting of, or containing naphthoquinone-(1,2)-diazide-sulfonic acid esters on supports such as metal plates or foils, e.g., aluminum or zinc, is known. After the coating has been dried, the light-sensitive material thus obtained is exposed to light under a master and the exposed coating is developed to produce a visible image by treatment with dilute alkaline solutions, e.g., dilute solutions of disodium phosphate or trisodium phosphate. If a positive master is used, the image, which accepts greasy ink, is a positive reproduction of the master. Thus, printing plates are obtained from which copies of the master can be made in a printing machine.

The known naphthoquinone-1,2-diazide sulfonic acid esters are disadvantageous in that they are only difficulty soluble in organic solvents at room temperature, and almost incompatible with alkali soluble resins, so that they separate out after standing for a short time. Further, they have a tendency to crystallize from the layer.

It has now been found that light-sensitive material consisting of a support, preferably metal or paper, and a light-sensitive coating comprising a naphthoquinone-(1,2)-diazide(2)-sulfonic acid ester corresponding to the general formula

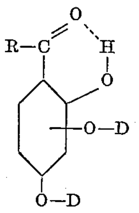

can be converted by photomechanical processes into particularly valuable printing plates. In the above formula, D is a naphthoquinone-(1,2)-diazide-(2)-4-sulfonyl radical or a naphthoquinone-(1,2)-diazide-(2)-5-sulfonyl radical and R is an aryl or substituted aryl radical.

Substituents which may be linked to R may be, for example, alkyl, alkoxy, halogen, and naphthoquinone-(1,2)-diazide-sulfonyl radicals.

Exemplary of the compounds which may be utilized in the present invention are the following:

FORMULA I

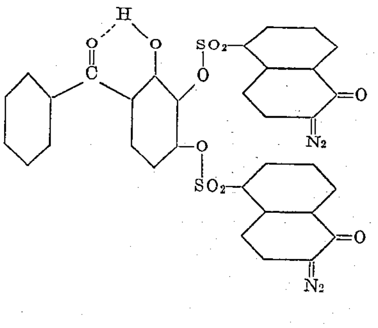

FORMULA II

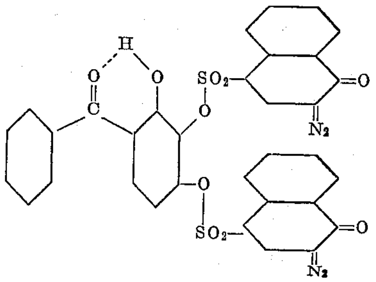

FORMULA III

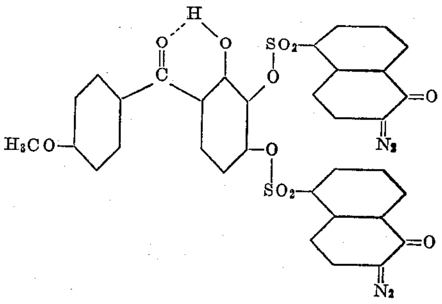

FORMULA IV

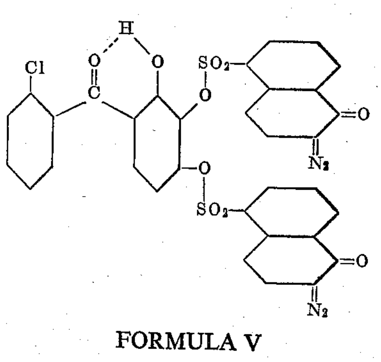

FORMULA V

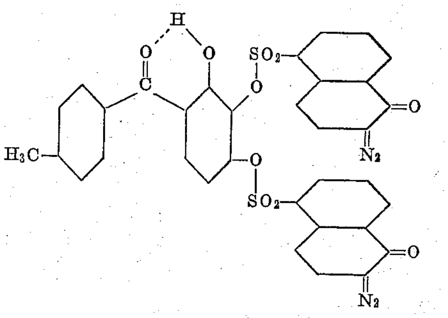

FORMULA VI

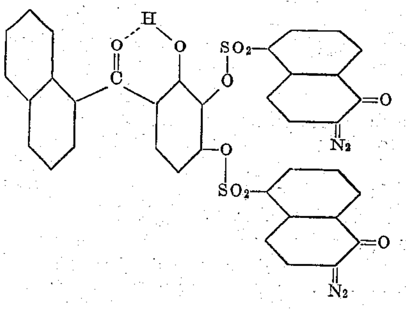

FORMULA VII

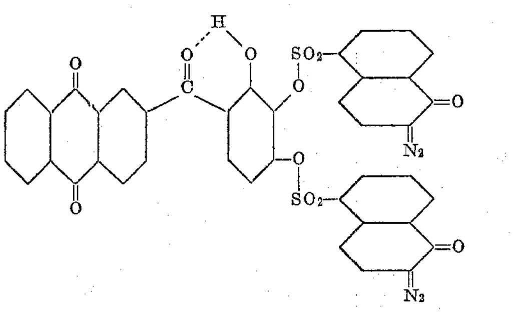

FORMULA VIII

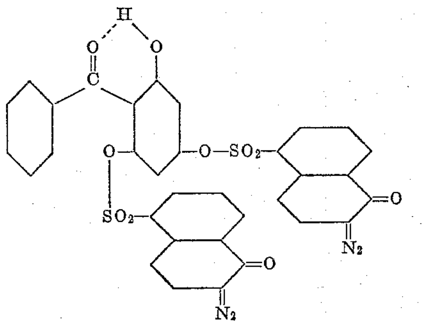

FORMULA IX

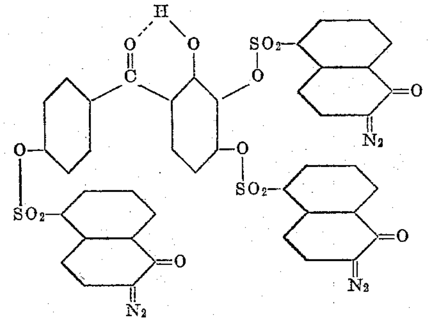

The light sensitive material provided with the reproduction layer according to the present invention is well suited for the preparation of planographic printing plates giving very long runs. It is of particular advantage to apply the light sensitive substances in combination with alkali soluble resins of the m-cresol-formaldehyde type. Even small additions of such resins, e.g. about 0.05 to about 2%, will result in improved printing performances. Additions of equal parts by weight of resin or even more are possible, but in most cases they cause no further improvement of the printing results. If, however, highly etch-resistant layers are to be produced for the preparation of printing plates for relief and intaglio printing, the light sensitive compounds can be mixed with the alkali soluble resins in proportions ranging from 1:1 to 1:6, preferably in proportions from 1:2 to 1:4. Because the required etch-resistance calls for a high percentage of resin, while, at the same time, considerable proportions of the light sensitive substance must be present in the layer to ensure an easy development of the exposed layer, very high demands are made of the light sensitive compounds with regard to their solubility and compatibility with resins. These demands were not met by the light sensitive substances hitherto used.

Owing to their particular chemical structure, i.e. the presence of several naphthoquinone-1,2-diazide sulfonic acid radicals linked to one phenyl residue and of an OH group in the same residue, which is linked to a carbonyl group through a hydrogen bond, the compounds of the present invention have particularly favorable characteristics with regard to their solubility in organic solvents at room temperature and their compatibility with high amounts of resins. These advantages enable the preparation of highly etch-resistant, homogeneous layers which are excellently suitable for the preparation of relief and intaglio printing plates. Moreover, the layers of the present invention can, in contradistinction to the more cumbersome transfer process using pigment paper, directly be applied to the metals to be etched, i.e. plates or cylinders, and the process can be further simplified due to the fact that positive copies can be produced, whereas pigment paper is suitable for the production of negative copies only.

The naphthoquinone-(1,2)-diazide-(2)-sulfonic acid esters corresponding to the general formula given above have an OH group in a neighboring position to a CO group and are insoluble in water. To produce superior coatings on the supports, the use, in the preparation of the coating solution, of organic solvents, in which the naphthoquinone-(1,2)-diazide-sulfonic acid esters are soluble at room temperature, is advantageous. If the esters are dissolved in a heated solvent, partial decomposition of the diazo compounds results. The following are exemplary of suitable solvents: ethyleneglycol monomethyl ether, ethylene glycol monoethyl ether, aliphatic esters, such as butyl acetate; aliphatic ketones, such as methyl isobutyl ketone or acetone or dioxane. These solvents are satisfactory also in cases where alkali-soluble resins are added to the coating solutions, which is of particular importance in the commercial production of etchable coatings.

The naphthoquinone-(1,2)-diazide-sulfonic acid esters corresponding to the general formula given above may be used either alone or in association one with another for the preparation of the light sensitive coatings. They can also be applied to the supports in association with other orthoquinone-diazide-sulfonic acid esters already known from the literature. The coatings are formed in known manner, the coating solutions containing the sulfonic acid esters being whirl-coated, brushed or cast upon the supports or applied in other suitable manner and the coating then dried.

The naphthoquinone-(1,2)-diazide-(2)-sulfonic acid esters of the above general formula, form coatings free of crystallization and which, therefore, are exceptionally well suited for the photomechanical preparation of printing plates. The printing plate is obtained photomechanically from the light-sensitive material in known manner, the light-sensitive coating being exposed under a master to the action of light and the exposed coating being developed with dilute alkaline solutions to an image which, in general, is of a yellow color of varying degrees of intensity. The developed coating is rinsed with water and, in the portions bared by the developer, the metal support is made water-conductive by treatment with an approximately 1 percent phosphoric acid solution, to which dextrin or gum arabic may be added. When the printing plate is inked up with greasy ink, the ink adheres to the remaining portions of the original light-sensitive coating and positive copies are obtained from positive masters.

The naphthoquinone-(1,2)-diazide-(2)-sulfonic acid esters of the above general formula are obtained as follows: a solution of one mole of a compound of the general formula

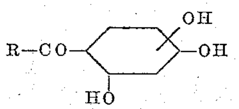

in which R is an aryl radical or a substituted aryl radical as described above, is mixed with a solution of two moles of a naphthoquinone-(1,2)-diazide-(2)-sulfochloride, the solvent used being, advantageously, dioxane. Condensation of the two starting materials to produce the desired reaction product is then induced by the dropwise introduction, at room temperature, of an aqueous solution of an alkali carbonate or alkali bicarbonate. In order that the formation of dyestuffs or of undesirable side reaction products will be prevented, the condensation agent is added to the reaction mixture in such a manner that, after the completion of condensation, the aqueous dioxane solution is neutral or only weakly alkaline. In general, the alkali bicarbonates are preferred as condensation agents. The solvents suitable for the esters obtained are listed above.

The above general information concerning the preparation of the naphthoquinone-(1,2)-diazide-sulfonic acid esters is amplified by the following details relative to the preparation of certain of these compounds:

2,3,4-trihydroxybenzophenone - bis - (naphthoquinone-(1,2)-diazide-(2)-5-sulfonic acid ester-(3,4)), corresponding to Formula I:

11.5 g. (1/20 mole) of 2,3,4-trihydroxybenzophenone are dissolved in 75 ml. of dioxane. Animal charcoal is added and the solution is filtered.

27 g. (1/10 mole) of naphthoquinone-(1,2)-diazide-(2)-5-sulfochloride are dissolved in 160 ml. of dioxane. Animal charcoal is added and the solution is filtered.

The filtrates are mixed together and 150 ml. of 10 percent sodium carbonate solution are introduced, dropwise, over the course of five minutes with thorough stirring. The reaction mixture is further stirred at room temperature for 20 minutes and then 50 ml. of 15 percent hydrochloric acid and 300 ml. of water are added. First, a dark brown resin-like product separates out; the mother liquor is siphoned off and fresh water is added to the precipitate until it turns into a yellow, readily filterable material. It is then filtered and the residue left in the filter is added to 400 ml. of a 5 percent disodium phosphate solution, which is then stirred for 14 hours at room temperature, and afterwards filtered. The filter residue is washed neutral with water. For further purification, the residue in the filter, while still wet, is stirred with 500 ml. of alcohol at room temperature for three hours, then filtered and briefly washed with alcohol; the product is freed from any entrapped solvent by digestion for half an hour in 500 ml. of distilled water. After filtration, the residue is washed with water and dried.

2,3,4 - trihydroxy - benzophenone - bis - (naphthoquinone-(1,2)-diazide-(2)-4-sulfonic acid ester-(3.4)), corresponding to Formula II:

23, g. (1/10 mole) of 2,3,4-trihydroxy-benzophenone are dissolved in 150 ml. of dioxane. Animal charcoal is added and the solution is filtered.

54 g. (1/5 mole) of naphthoquinone-(1,2)-diazide-(2)-4-sulfonic acid chloride are dissolved in 320 ml. of dioxane. Animal charcoal is added and the solution is filtered.

The filtrates are mixed together and then 800 ml. of a sodium bicarbonate solution, which at room temperature is saturated, are introduced over the course of five minutes, with thorough stirring. The brown solution should be neutral (pH 7) to weakly alkaline (pH 7.9). After the sodium bicarbonate solution has been added, the mixture is further stirred for 15 minutes. It is then introduced into 990 ml. of 3 percent hydrochloric acid. A brown resin-like product precipitates out. The mother liquor is siphoned off and water is added to the precipitate as many times as is necessary to convert it into a light brown, readily filterable material. It is then filtered and the excess hydrochloric acid is washed from the filtration residue with water. The residue is then stirred for one hour in 500 ml. of ethyl alcohol, filtered, washed two to three times with ethyl alcohol and then with water until the mother liquor is colorless; it is then dried.

4' - methoxy - 2,3,4 - trihydroxybenzophenone - bis-(naphthoquinone-(1,2)-diazide-(2)-5-sulfonic acid ester-(3,4)), corresponding to Formula III:

8.7 g. (1/30 mole) of 4'-methoxy-2,3,4-trihydroxybenzophenone are dissolved in 100 ml. of dioxane. Animal charcoal is added and the solution is filtered.

17.8 g. (2/30 mole) of naphthoquinone-(1,2)-diazide-(2)-5-sulfonic acid chloride are dissolved in 110 ml. of dioxane. Animal charcoal is added and the solution is filtered.

The filtrates are mixed together and 140 ml. of an aqueous sodium bicarbonate solution, which is saturated at room temperature, is introduced over the course of about 5 minutes, with thorough stirring. The light brown solution should be neutral to weakly alkaline (pH 7.9). After the sodium bicarbonate solution has been added, the mixture is further stirred for 15 minutes and is then introduced, with thorough stirring, into 2200 ml. of 3 percent hydrochloric acid. The bisester precipitates out as a light yellow material. It is filtered, washed with water so that excess hydrochloric acid is removed, and then dried.

If in the above process 8.8 g. (1/30 mole of 2'-chloro-2,3,4-trihydroxybenzophenone or 8.2 g. (1/30 mole) of 4'-methyl-2,3,4-trihydroxybenzophenone are used instead of 1/30 mole of 4'-methoxy-2,3,4-trihydroxybenzophenone, the products obtained are, respectively, 2'-chloro-2,3,4-trihydroxybenzophenone - bis - (naphthoquinone - (1,2)-diazide-(2)-5-sulfonic acid ester-(3,4)), corresponding to Formula IV, and 4'-methyl-2,3,4-trihydroxybenzophenone - bis - (naphthoquinone - 1,2) - diazide - (2) - 5-sulfonic acid ester (3,4)), corresponding to Formula V.

2,3,4 - trihydroxyphenyl - naphthyl - (1') - ketone - bis-(naphthoquinone-(1,2)-diazide (2)-5-sulfonic acid ester-(3,4)), corresponding to Formula VI:

5.6 g. (1/50 mole) of 2,3,4-trihydroxy-phenylnaphthyl-(1)-ketone are dissolved in 60 ml. of dioxane. Animal charcoal is added and the solution is filtered.

10.75 g. (1/25 mole) of naphthoquinone-(1,2)-diazide-(2)-5-sulfochloride are dissolved in 70 ml. of dioxane. Animal charcoal is added and the solution is filtered.

The filtrates are mixed together and 85 ml. of a sodium bicarbonate solution, staturated at room temperature, is introduced dropwise over the course of about five minutes with thorough stirring. The yellow-brown solution is neutral to weakly alkaline. The mixture is further stirred at room temperature for 15 minutes and is then introduced into 300 ml. of 3 percent hydrochloric acid, with thorough stirring. First, a brown, resin-like product separates out. The mother liquor is siphoned off and fresh water is added to the precipitated product until it turns into a yellow-colored, readily filterable material. Finally, the product is filtered and the residue in the filter is washed neutral and then dried.

If, in the above process, 7.2 g. (1/50 mole) of 2,3,4-trihydroxy-phenylanthraquinoyl-(2)-ketone dissolved in 80 ml. of dioxane are used instead of 1/50 mole of 2,3,4-trihydroxyphenyl-naphthyl-(1)-ketone, the 2,3,4-trihydroxyphenyl - anthraquinoyl - (2) - ketone-bis-(naphthoquinone-(1,2)-diazide-(2)-5-sulfonic acid ester-(3,4)), corresponding to Formula VII is obtained in an analogous manner.

2,4,6 - trihydroxybenzophenone - bis - (naphthoquinone-(1,2)-diazide-(2)-5-sulfonic acid ester-(2,4)), corresponding to Formula VIII:

3.3 g. (1/70 mole) of 2,4,6-trihydroxybenzophenone are dissolved in 25 ml. of dioxane. Animal charcoal is added and the solution is filtered.

7.6 g. (2/70 mole) of naphthoquinone-(1,2)-diazide-(2)-5-sulfonic acid chloride are dissolved in 60 ml. of dioxane. Animal charcoal is added and the solution is filtered.

The filtrates are mixed and 60 ml. of an aqueous solution of sodium bicarbonate, which at room temperature is saturated, are introduced dropwise over the course of about three minutes with thorough stirring. The yellow-brown solution should be neutral (pH 7) to weakly alkaline (pH 7.9). After the sodium bicarbonate solution has been added, the solution is immediately introduced into 330 ml. of 3 percent hydrochloric acid with thorough stirring. First, a resin-like, yellow-brown product separates out. The mother liquor is siphoned off and fresh water is added to the precipitated product until a yellow-colored, readily filterable material is obtained. This is filtered, washed with water to remove excess hydrochloric acid, and then dried.

2,3,4,4′ - tetrahydroxy - benzophenone - tris - (naphthoquinone-(1,2)-diazide-(2)-5-sulfonic acid ester-(3,4,4′)), corresponding to Formula IX:

12.4 g. (1/20 mol) of 2,3,4,4′-tetrahydroxybenzophenone are dissolved in 100 ml. of dioxane. Animal charcoal is added and the solution is filtered.

40.2 g. (3/20 mole) of naphthoquinone-(1,2)-diazide-(2)-5-sulfochloride are dissolved in 260 ml. of dioxane. Animal charcoal is added and the solution is filtered.

The filtrates are mixed and then, over the course of ten minutes, first 350 ml. of a sodium bicarbonate solution, saturated at room temperature, and then 50 ml. of 10 percent sodium carbonate solution are introduced, dropwise, with thorough stirring. After the addition of the sodium bicarbonate and the sodium carbonate solutions, the light brown solution is weakly alkaline. After the reaction mixture has been further intensively stirred for 20 minutes, it is introduced, with thorough stirring, into 1600 ml. of 3 percent hydrochloric acid. The triester precipitates out in the form of a yellow-brown material. The material is filtered, washed neutral with water, dissolved in 600 ml. of glycolmonomethyl ether, filtered over animal charcoal and precipitated by introduction into 3000 ml. of saturated common salt solution. After being separated by suction filtration, the filtration residue is intensively washed with water and dried.

The invention will be further illustrated by reference to the following specific examples.

*Example 1*

2 g. of the compound corresponding to Formula I are dissolved in 100 ml. of glycolmonomethyl ether. A roughened aluminum foil is coated with the filtered solution and the coating is dried in hot air. For the preparation of a printing plate, the coated side of the foil is exposed to light under a master and the exposed coating is treated with a cotton pad soaked in about 1.5 percent aqueous trisodium phosphate solution, whereupon a yellow image of the master remains on those portions not struck by light. After the foil has been rinsed down with water, wiped over with a cotton pad soaked in a 1 percent phosphoric acid solution containing gum arabic or dextrin, and inked up with greasy ink, the image is ready for printing.

*Example 2*

2 g. of the compound corresponding to Formula II are dissolved in 100 ml. of glycolmonomethyl ether. Further procedure is as described in Example 1. The coating having been exposed to light under a master, it is developed with a developer containing 20 g. of crystallized trisodium phosphate and 40 g. of crystallized disodium phosphate dissolved in one liter of water. After the foil has been rinsed down with water, wiped over with a cotton pad soaked in 1 percent phosphoric acid and inked up with greasy ink, it is ready for printing.

*Example 3*

2 g. of the compound corresponding to Formula III are dissolved in a mixture of 80 ml. of glycolmonomethyl ether and 20 ml. of butyl acetate. Further procedure is as in Example 2.

*Example 4*

The compounds corresponding to Formulae I and V are mixed together in 4:1 proportions. 2.5 g. of this mixture are dissolved in 100 ml. of glycolmonoethyl ether and the solution is filtered and coated upon a roughened aluminum foil. The coating is dried in hot air and further procedure is as in Example 1.

*Example 5*

7 g. of m-cresol-formaldehyde resin novolak, e.g., the product commercially available under the trade name Alnovol 429K, 1.4 g. of 2,3,4-trihydroxybenzophenone-naphthoquinone-(1,2)-diazide-(2)-5-sulfonic acid ester (German Patent 938,233—Formula X), and 1.4 g. of 2,3,4 - trihydroxybenzophenone - naphthoquinone - (1,2)-diazide-(2)-5-sulfonic acid bisester (Formula I) are dissolved, with stirring, in a mixture of 80 ml. of glycolmonomethyl ether and 20 ml. of butyl acetate. The filtered solution is coated upon a roughened aluminum foil and the coating is dried in a hot air current. After the material has been exposed to light under a diapositive, the light decomposition product and the resin is dissolved away in the exposed portions by wiping over with a 2.5 percent aqueous trisodium phosphate solution containing 10–15 parts, by volume, of glycolmonomethyl ether and the image is then fixed by sponging down with a 1.7 percent phosphoric acid solution. After inking up, either by hand or in an offset machine, the printing plate is ready for the printing process.

*Example 6*

2 g. of 2,3,4-trihydroxy-benzophenone-naphthoquinone-(1,2)-diazide-(2)-5-sulfonic acid bisester corresponding to Formula I, 1 g. of 2,3,4-trihydroxybenzophenone-naphthoquinone-(1,2)-diazide-(2)-5-sulfonic acid ester and 10 g. of m-cresol formaldehyde resin novolak (see Example 5) are dissolved in 100 ml. of glycolmonomethyl ether. 0.3 g. of castor oil and 0.5 g. of Methyl Violet BB (Schultz' Farbstofftabellen, 7th edition, 1st vol. (1931), p. 327, No. 783) are added and the solution is filtered and then coated in known manner, e.g., by means of a whirler, upon a clean, polished, zinc plate. The coating is dried in hot air. For the preparation of a printing block, the coated side of the zinc plate is exposed to light under a diapositive and the coating, now exposed, is treated with a cotton pad soaked in a 2.5 percent trisodium phosphate solution containing 10–15 percent by volume of glycolmonomethyl ether. The portions of the coating which were struck by light are thereby removed from the zinc surface while portions of the coating which were protected by the master (image) remain on the metal support. After the developed zinc plate has been rinsed down with running water from the tap, the plate is deep-etched with 7–8 percent nitric acid in a stone trough provided with rotors, either by the usual multistage process or by the process of single stage etching.

*Example 7*

2 g. of 2,3,4-trihydroxy-benzophenone-naphthoquinone-(1,2)-diazide-(2)-5-sulfonic acid ester, 2 g. of 2,3,4-trihydroxy - benzophenone - naphthoquinone - 1,2)-diazide-(2)-5-sulfonic acid bisester, corresponding to Formula I, and 10 g. of m-cresol-formaldehyde resin novolak are dissolved in 100 ml. of glycolmonomethyl ether. 0.3 g. of sesame oil and 0.5 g. of Rosaniline Hydrochloride (Schultz' Farbstofftabellen, 7th edition (1931) 1st vol., p. 324, No. 780) are added, and the solution is filtered, and then coated upon a copper plate that has been polished smooth. After being exposed to light under a photographic negative, the coating is treated with a cotton pad soaked in a 2.5 percent trisodium phosphate solution containing 10–15 percent by volume of glycolmonomethyl ether. The portions of the coating struck by light are thereby removed from the copper plate and the portions thereof thus bared are then etched with a ferric chloride solution of 40° Bé. at 20–22° C. An excellent plate for intaglio printing is obtained.

The light-sensitive coating is also suitable for the direct coating of rotating copper cylinders; it is applied by means of a spray gun.

A mixture of 2,3,4-trihydroxy-benzophenone-naphthoquinone-(1,2)-diazide-(2)-4-sulfonic acid ester (German Patent 938,233—Formula IX) and 2,3,4-trihydroxy-benzophenone - naphthoquinone - 1,2)-diazide-(2)-4-sulfonic acid bisester, corresponding to Formula II, may be used instead of the mixture of 2,3,4-trihydroxy-benzophenone-naphthoquinone - (1,2)-diazide-(2)-5-sulfonic acid ester and 2,3,4 - trihydroxy-benzophenone-naphthoquinone-(1, 2)-diazide-(2)-5-sulfonic acid bisester, corresponding to Formula I, with equally good results.

*Example 8*

2 g. of 2,3,4-trihydroxy-benzophenone-naphthoquinone-(1,2)-diazide-(2)-5-sulfonic acid bisester, corresponding to Formula I, 2 g. of 2,3,4-trihydroxy-benzophenone-naphthoquinone - (1,2) - diazide-(2)-5-sulfonic acid ester and 5 g. of m-cresol-formaldehyde resin novolak are dissolved in a mixture of 80 ml. of glycolmonomethyl ether and 20 ml. of glycolmonoethyl ether. 0.3 g. of sesame oil and 0.5 g. of Rosaniline Hydrochloride (Schultz' Farbstofftabellen, 7th edition (1931), 1st vol., p. 324, No. 780) are added and the solution is filtered and whirl-coated in known manner upon a bimetal foil consisting of aluminum and copper. After the coating has been exposed to light under a diapositive, the portions struck by light are removed by treatment with an approximately 2.5 percent trisodium phosphate solution containing 10–15 percent by volume of glycolmonomethyl ether, applied by means of a cotton pad. The bared copper surface is then etched away with a ferric nitrate solution containing 160 g. of $Fe(NO_3)_3x9H_2O$ in 100 ml. of water. A printing plate for planographic and offset printing, which is capable of giving very long runs, is obtained. A bimetal foil of steel and copper can be used instead of the aluminum and copper foil with equal success.

*Example 9*

2 g. of 2,3,4-trihydroxy-2'-chlorobenzophenone-naphthoquinone-(1,2)-diazide-5-sulfonic acid bisester, corresponding to Formula IV, 2 g. of 2,3,4-trihydroxy-2',5'-dimethoxy - benzophenone - naphthoquinone-(1,2)-diazide-(2)-5-sulfonic acid ester (German Patent 938,233—Formula XIX), and 8 g. of m-cresol-formaldehyde resin novolak are dissolved in a mixture consisting of 50 ml. of glycolmonomethyl ether, 30 ml. of glycolmonoethyl ether and 20 ml. of butyl acetate. 0.2 g. of castor oil and 0.5 g. of Rosaniline Hydrochloride (Schultz' Farbstofftabellen, 7th edition (1931), 1st, vol., p. 324, No. 780) are added and the solution is filtered and then coated upon a metal foil consisting of layers of aluminum, copper and chromium. After the coating has been exposed under a photographic negative, the portions struck by light are removed with a 2.5 percent trisodium phosphate solution containing about 10–15 percent by volume of glycolmonomethyl ether applied by means of a cotton pad. The plate is then rinsed with running water, dried in hot air and etched. Chromium etching is performed with a mixture of calcium chloride, hydrochloric acid and glycerine as described in U.S. Patent No. 2,687,345, by which process the copper beneath the chromium layer is not affected. A printing plate for planographic and offset printing is obtained in which the printing elements consist of copper while the non-printing surface consists of chromium.

*Example 10*

The procedure described in Example 6 is followed, but a copper foil of a thickness of about 30–70μ laminated to an electrically non-conductive plastic foil is used as the support. After the coating has been exposed under a diapositive showing a wiring scheme and the portions struck by light have been removed with a 2.5 percent trisodium phosphate solution containing about 10–15 percent by volume of glycol-monoethyl ether, the image-bearing side of the support is washed with running water and dried in hot air. The bared portions of the copper surface are then etched away with ferric chloride solution of 40° Bé. at room temperature. A printed circuit for the conduction of an electric current is obtained.

Instead of a metal foil laminated to an electrically non-conductive plastic, a transparent or matted plastic foil provided with a vacuum-deposited metal surface (thickness, e.g., about 1μ) can be used as the support with equally good results. Component parts for electrical construction can be prepared advantageously in this way.

*Example 11*

The procedure described in Example 6 is followed, but an aluminum foil is used as the support. After the coating has been exposed under a master, e.g., a photographic negative, and the portions struck by light removed by treatment with a 2.5 percent trisodium phosphate solution containing about 10–15 percent by volume of glycolmonomethyl ether, the aluminum foil is washed in running water and dried in hot air. For the preparation of a uniformly black, etched image on aluminum, the image-bearing side of the foil is first pre-etched at room temperature by wiping over for 1–2 minutes with a cotton pad soaked in an etching solution, containing the following components per liter (Etching Solution No. I):

297.0 g. of calcium chloride
255.6 g. of ferric chloride (commercial quality)
132.0 ml. of concentrated hydrochloric acid (commercial quality)
7.9 ml. of 80 percent nitric acid
Remainder: water Without the foil being rinsed with water, etching is continued for about two minutes with the following solution (Etching Solution No. II):

450.0 g. of calcium chloride
55.0 g. of ferric chloride (commercial quality)
12.0 cc. of 80 percent nitric acid (commercial quality)
24.0 cc. of concentrated hydrochloric acid (commercial quality)
7.5 g. of cupric chloride ($CuCl_2x2\ H_2O$)
Remainder: water A uniformly black, reversed etched image of the master used is formed. It can be used as the ink carrier in an offset machine if, after the etching process, the portions of the coating not struck by light, and thus still remaining on the foil, are dissolved away with a solvent, e.g., ethyleneglycol monomethyl ether, and the bared aluminum is made water-conductive by sponging down with a suitable developer or fixing solution. The performance of the printing plate prepared in this manner can be further improved if the etched image is lacquered in known manner and the portions not struck by light then removed.

*Example 12*

A commercially available non-sensitized paper printing foil, which is impermeable to organic solvents, is coated with a 2 percent solution, in glycolmonomethyl ether, of the diazo compound corresponding to Formula I and is dried in a hot air current. The foil thus sensitized is exposed under a master and the light-decomposition product of the diazo compound in the portions struck by light is removed by rubbing down with a cotton pad soaked in a 2 percent aqueous trisodium phosphate solution. After excess developer has been rinsed away with water, the paper printing foil is sponged over with a commercially available wetting agent and then inked up with greasy ink, by hand or in a printing machine. The parts of the printing foil which were not struck by light, accept greasy ink.

It will be obvious to those skilled in the art that many modifications may be made within the scope of the present invention without departing from the spirit thereof, and the invention includes all such modifications.

What is claimed is:

1. A compound having the formula

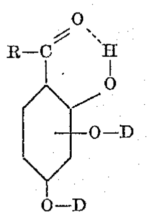

in which R is an aryl group and D is selected from the group consisting of naphthoquinone-(1,2)-diazide-(2)-4-sulfonyl and naphthoquinone-(1,2)-diazide-(2)-5-sulfonyl groups.

2. A compound having the formula

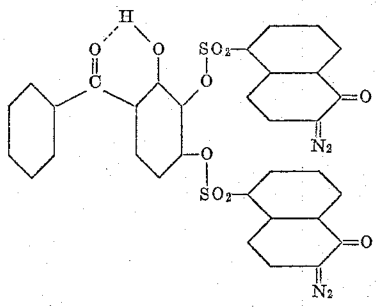

3. A compound having the formula

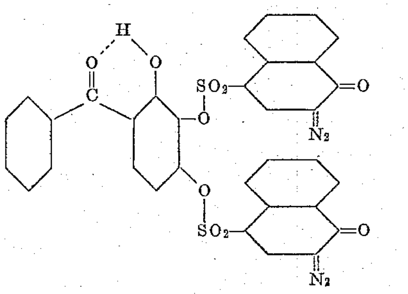

4. A compound having the formula

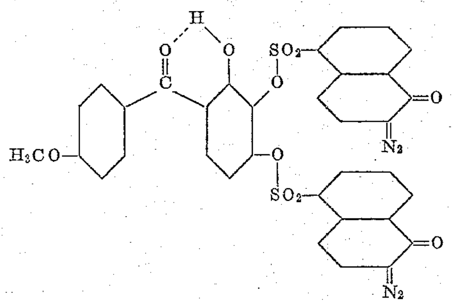

5. A compound having the formula

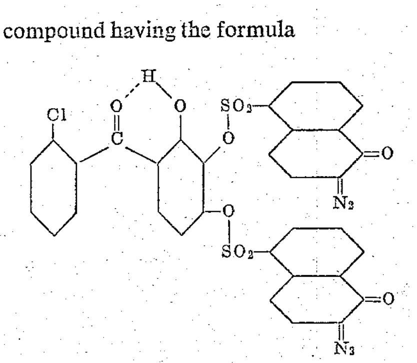

6. A compound having the formula

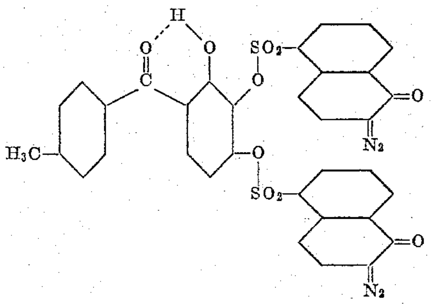

7. A compound having the formula

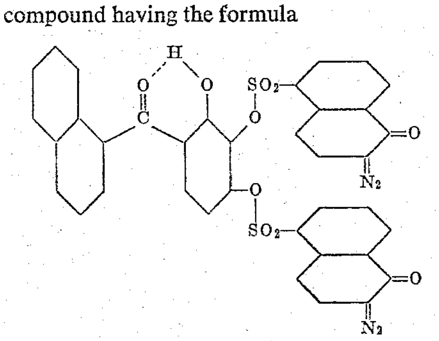

8. A compound having the formula

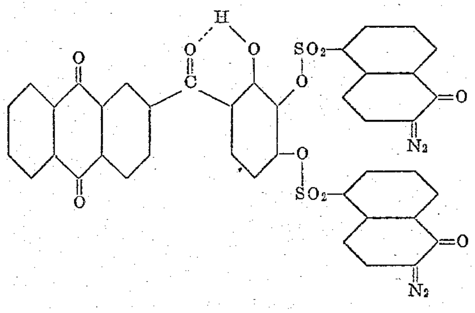

9. A compound having the formula

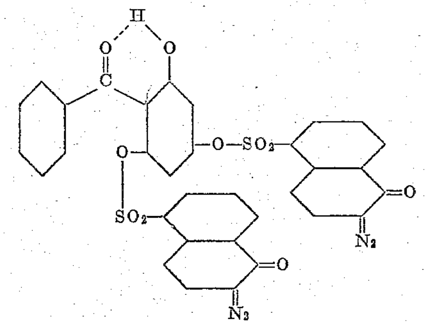

10. A compound having the formula

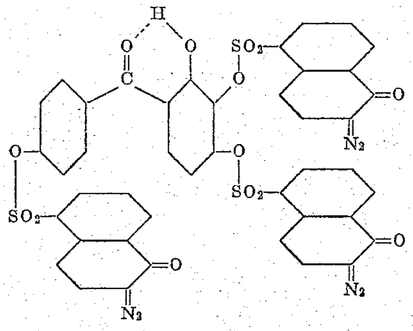

11. A presensitized printing plate comprising a base material having a coating thereon, the coating comprising a compound having the formula

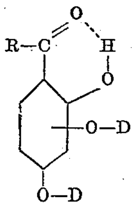

in which R is an aryl group and D is selected from the group consisting of naphthoquinone-(1,2)-diazide-(2)-4-sulfonyl and naphthoquinone-(1,2)-diazide-(2)-5-sulfonyl groups.

12. A presensitized printing plate comprising a base material having a coating thereon, the coating comprising a compound having the formula

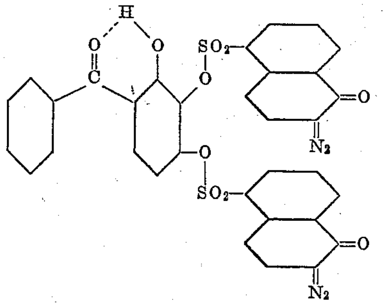

13. A presensitized printing plate comprising a base material having a coating thereon, the coating comprising a compound having the formula

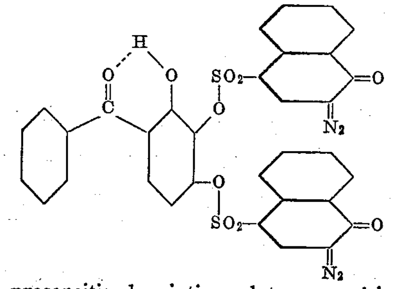

14. A presensitized printing plate comprising a base material having a coating thereon, the coating comprising a compound having the formula

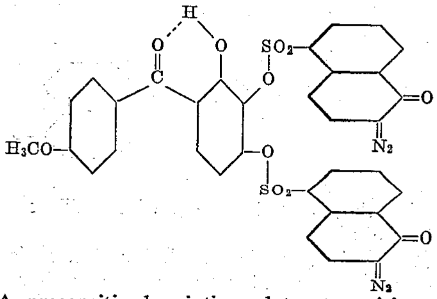

15. A presensitized printing plate comprising a base material having a coating thereon, the coating comprising a compound having the formula

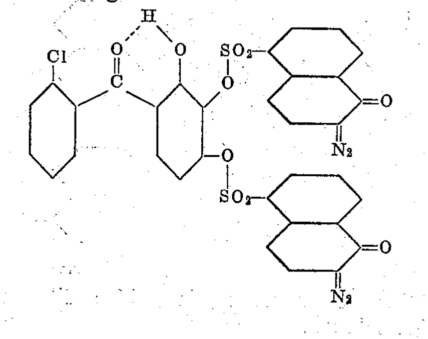

16. A presensitized printing plate comprising a base material having a coating thereon, the coating comprising a compound having the formula

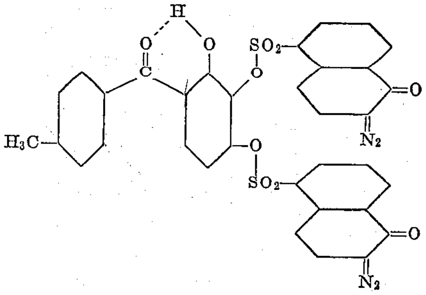

17. A presensitized printing plate comprising a base material having a coating thereon, the coating comprising a compound having the formula

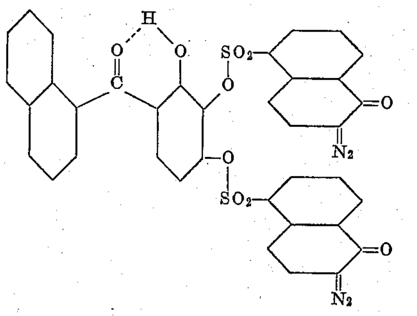

18. A presensitized printing plate comprising a base material having a coating thereon, the coating comprising a compound having the formula

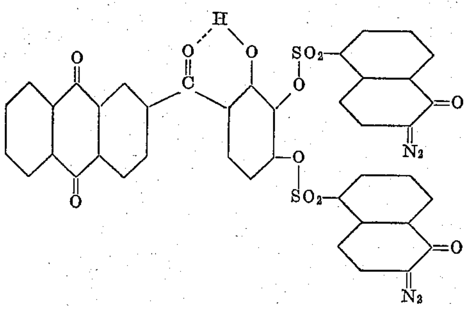

19. A presensitized printing plate comprising a base material having a coating thereon, the coating comprising a compound having the formula

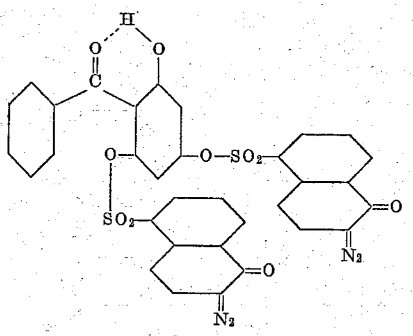

20. A presensitized printing plate comprising a base material having a coating thereon, the coating comprising a compound having the formula

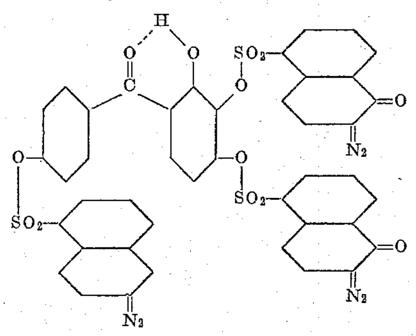

21. A presensitized printing plate according to claim 11 in which the coating includes an alkali-soluble phenol aldehyde resin novolak.

22. A presensitized printing plate according to claim 21 in which the quantity of novolak present in the coating is at least equivalent to the compound.

23. A process for making a printing plate which comprises exposing a coated base material to light under a master, the coating comprising a compound having the formula

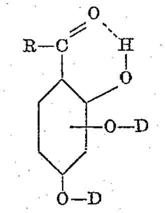

in which R is an aryl group and D is selected from the group consisting of naphthoquinone-(1,2)-diazide-(2)-4-sulfonyl and naphthoquinone-(1,2)-diazide-(2)-5-sulfonyl groups, and treating the exposed coating with a dilute alkaline developing solution.

24. A process for making a printing plate which comprises exposing a coated base material to light under a master, the coating comprising a compound having the formula

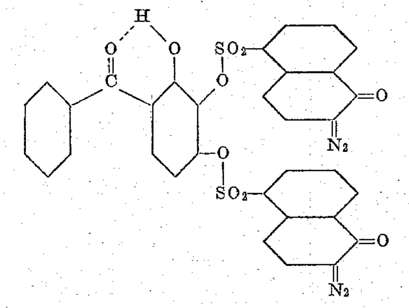

and treating the exposed coating with a dilute alkaline developing solution.

25. A process for making a printing plate which comprises exposing a coated base material to light under a master, the coating comprising a compound having the formula

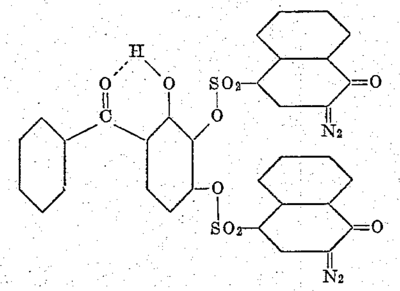

and treating the exposed coating with a dilute alkaline developing solution.

26. A process for making a printing plate which comprises exposing a coated base material to light under a master, the coating comprising a compound having the formula

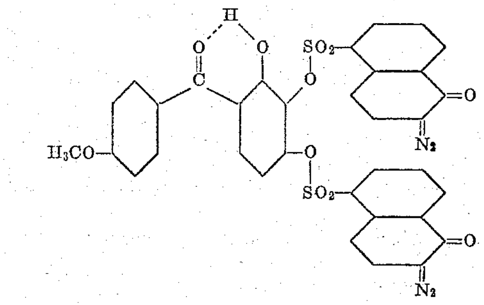

and treating the exposed coating with a dilute alkaline developing solution.

27. A process for making a printing plate which comprises exposing a coated base material to light under a master, the coating comprising a compound having the formula

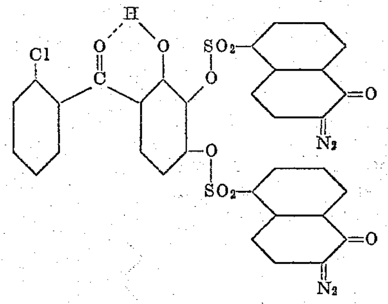

and treating the exposed coating with a dilute alkaline developing solution.

28. A process for making a printing plate which comprises exposing a coated base material to light under a master, the coating comprising a compound having the formula

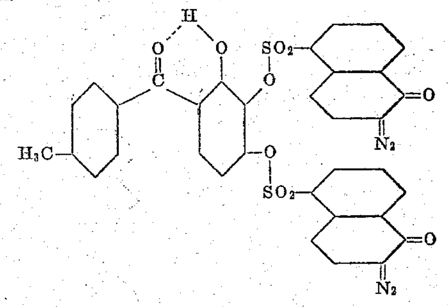

and treating the exposed coating with a dilute alkaline developing solution.

29. A process for making a printing plate which comprises exposing a coated base material to light under a master, the coating comprising a compound having the formula

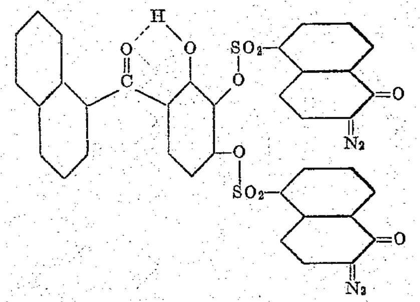

and treating the exposed coating with a dilute alkaline developing solution.

30. A process for making a printing plate which comprises exposing a coated base material to light under a master, the coating comprising a compound having the formula

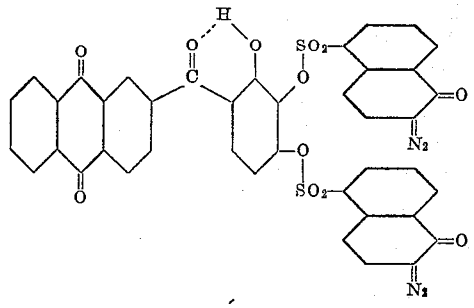

and treating the exposed coating with a dilute alkaline developing solution.

31. A process for making a printing plate which comprises exposing a coated base material to light under a master, the coating comprising a compound having the formula

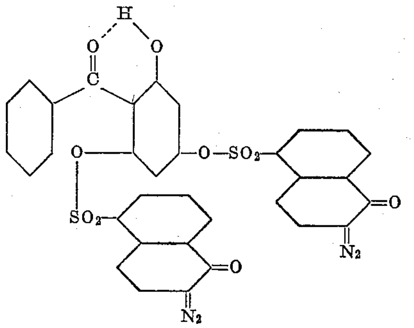

and treating the exposed coating with a dilute alkaline developing solution.

32. A process for making a printing plate which comprises exposing a coated base material to light under a master, the coating comprising a compound having the formula

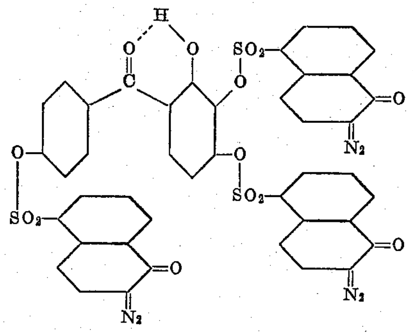

and treating the exposed coating with a dilute alkaline developing solution.

33. A process according to claim 23 in which the coating includes an alkali-soluble phenol aldehyde resin novolak.

34. A process according to claim 33 in which the quantity of novolak present in the coating is at least equivalent to the compound.

References Cited in the file of this patent

UNITED STATES PATENTS

| | | |
|---|---|---|
| 3,061,430 | Uhlig et al. | Oct. 30, 1962 |

FOREIGN PATENTS

| | | |
|---|---|---|
| 711,626 | Great Britain | July 7, 1954 |
| 732,544 | Great Britain | June 29, 1955 |
| 739,654 | Great Britain | Nov. 2, 1955 |